United States Patent [19]

Davis et al.

[11] 4,030,288
[45] June 21, 1977

[54] MODULAR GAS TURBINE ENGINE ASSEMBLY

[75] Inventors: Warren Wiley Davis, Dunlap; David Edward Keedy, Pekin, both of Ill.

[73] Assignee: Caterpillar Tractor Co., Peoria, Ill.

[22] Filed: Nov. 10, 1975

[21] Appl. No.: 630,476

[52] U.S. Cl. .................. 60/39.16 R; 60/39.31; 60/39.32; 60/39.51 R
[51] Int. Cl.² .................. F02C 3/10; F02C 7/20
[58] Field of Search ............ 415/68, 189, 201; 60/39.16, 39.31, 39.32

[56] References Cited

UNITED STATES PATENTS

| | | | |
|---|---|---|---|
| 2,738,647 | 3/1956 | Hill | 60/39.31 |
| 3,150,820 | 9/1964 | Jekat et al. | 415/201 |
| 3,169,749 | 2/1965 | Harris | 415/68 |
| 3,358,440 | 12/1967 | Freid | 60/39.31 |
| 3,759,323 | 9/1973 | Dawson et al. | 165/166 |
| 3,761,205 | 9/1973 | Cronstedt | 415/201 |
| 3,823,553 | 7/1974 | Smith | 60/39.16 R |
| 3,842,595 | 10/1974 | Smith et al. | 60/39.32 |

*Primary Examiner*—Carlton R. Croyle
*Assistant Examiner*—L. J. Casaregola
*Attorney, Agent, or Firm*—Phillips, Moore, Weissenberger, Lempio & Majestic

[57] ABSTRACT

The invention is concerned with a modular gas turbine engine assembly. The assembly includes a tubular case to which are assembled a gasifier module and a power output module. The gasifier module and the power output module are each slidably sealed to respective inwardly extending, generally removable flanges within the case. The gasifier module has a first tubular housing fixedly detachably attachable with a first end thereof adjacent a first end of the case with the axis of the first housing aligned generally with the axis of the case, a compressor generally within a second end of said first housing, a combustor generally extending outwardly from said first end of said first housing and a first integral shaft extending from the compressor to adjacent the combustor. A gasifier turbine extends generally outwardly radially from the shaft and has first blades positioned to be in the path of the exhaust gases exiting the combustor to drive the first shaft and thereby drive the compressor. The power output module has a second tubular housing fixedly detachably attachable with a first end thereof adjacent a second end of the case with the axis of the second housing aligned generally with the axis of the case, a power turbine generally extending outwardly from the first end of the second housing having second blades positioned to be in the path of the exhaust gases exiting the gasifier turbine, output gear means, and a second shaft driven by said power turbine and driving said output gear means.

25 Claims, 5 Drawing Figures

MODULAR GAS TURBINE ENGINE ASSEMBLY

BACKGROUND OF THE INVENTION

1. Field of the Invention

The invention relates to the art of gas turbine engines and more particularly to the art of modular gas turbine engines. More particularly the invention is concerned with a particular and disassembleable modular gas turbine engine assembly which is disassembleable into a gasifier module, a case and a power output module for easy servicing. The particular assembly of the invention also allows for interchangeability of parts since it provides for alignment of the individual module and the case relative to one another.

2. Prior Art

A number of modular gas turbine engines are known. For example, Solar produces some such engines in the form of vertically removable modules as described for example in Gas Turbine International of March-April 1972 on page 3 thereof. This type of modular gas turbine engine assembly requires that the individual sections or modules thereof be removed vertically and further requires that the shafts between modules be themselves disassembleable one from another so as to be vertically removable in sections with the rest of the modules thereof. Such modular gas turbine engine assemblies have a tendency to be relatively large for the horsepower available. Avco Lycoming produces a "TS" series of modular gas turbine engines as discussed for example in Gas Turbine World, dated March 1974 on page 27. Dresser Industries, as described in Sawyer's Gas Turbine catalog for 1970 at page 179 discloses yet other modular gas turbine engine assemblies. Yet another modular gas turbine engine is described in U.S. Pat. No. 3,842,595. A pressure seal for separating elements of a gas turbine engine shroud assembly is disclosed in detail in U.S. Pat. No. 3,869,222. U.S. Pat. No. 3,169,749 is concerned with expansion devices in the form of axially spaced cylindrical bellows for turbine casings. U.S. Pat. No. 3,759,323 discloses a heat exchanger which is useful with a gas turbine engine and is attachable thereto.

SUMMARY OF THE INVENTION

The present invention is concerned with a unique modular gas turbine engine assembly. As a first module the assembly includes a tubular case. As a second module the assembly includes a gasifier module having a first tubular housing fixedly detachably attachable with a first end thereof adjacent a first end of the case with the axis of the first housing aligned generally with the axis of the case, a compressor generally within a second end of the first housing, a combustor generally extending outwardly from the first end of the first housing, and a first integral shaft extending from the compressor to adjacent the combustor. A gasifier turbine is provided extending outwardly radially from the first shaft and having first blades positioned to be in the path of the exhaust gases exiting the combustor to drive the first shaft and thereby drive the compressor. The third module is a power output module having a second tubular housing fixedly detachably attachable with a first end thereof adjacent a second end of the case with the axis of the second housing aligned generally with the axis of the case, a power turbine generally extending outwardly from the first end of the second housing having second blades positioned to be in the path of the exhaust gases exiting the gasifier turbine, output gear means and a second shaft driven by the power turbine and driving the output gear means. First and second means are provided each extending inwardly within the case, said first means generally towards the said combustor and said second means generally towards said power turbine. First slidable sealing means are provided for sealably adjustably sealing the gasifier module adjacent the combustor to the first extending means. Second slidable sealing means are provided for sealing the power output module adjacent the power turbine to the second extending means.

As preferred embodiments of the invention there are further provided any or all of (1) means extending from the exterior of the case for mounting it to a frame; (2) an adaptation whereby said gasifier turbine is detachably attachable to said first shaft so that removal of said gasifier turbine provides access to said combustor; (3) a detachably attachable extension shaft drivedly communicating the second shaft with the output gear means; (4) an adaptation wherein the gasifier module includes an auxilliary gear box intermediate the compressor and the combustor driven by the first shaft; (5) annular channel means extending interiorly from the case intermediate the first and second extending means for directing the combustion gases from the first blades to the second blades; and (6) a heat exchanger attached to receive compressed gas from the compressor, heat said compressed gas therein and pass the resulting heated compressed gas to said combustor and to receive the exhaust gases from the power turbine, cool the exhaust gases therein while transferring some of the heat thereof to the compressed gas and pass the resulting cooled exhaust gases to the exterior of the heat exchanger.

It is an object of the present invention to provide a modular gas turbine engine assembly wherein the gasifier module part thereof and the power output module part thereof are each removable horizontally from the case thereof.

Another object of the invention is to provide a modular gas turbine engine assembly with interchangeable modules.

Yet another object of the invention is to provide a modular gas turbine engine assembly including slidable sealing means whereby the gasifier module and the power output module thereof are easily and quickly aligned within the cases thereof.

Still another object of the invention is to provide a modular gas turbine assembly wherein the case portion thereof is mountable to a frame and the gasifier module and power output module thereof are removable from the case without removing said case from said frame.

Another object still of the invention is to provide a modular gas turbine engine assembly which includes a turbine nozzle mounted to the case of the assembly whereby when the gasifier module is removed from said case the combustor thereof is readily available for servicing.

A further object of the invention is to provide such an assembly wherein the gasifier turbine portion thereof is detachably attachable from the shaft of the gasifier module to provide ready access to the combustor.

Further still, it is an object of the invention to provide an assembly which includes a heat exchanger as an additional module, said heat exchanger serving to transfer heat from exhaust gases to compressed air prior to the introduction of said compressed air to the combustor and to at the same time cool the exhaust gases before they are released to the atmosphere.

Other objects of the invention will become apparent from the following description and from the drawings.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
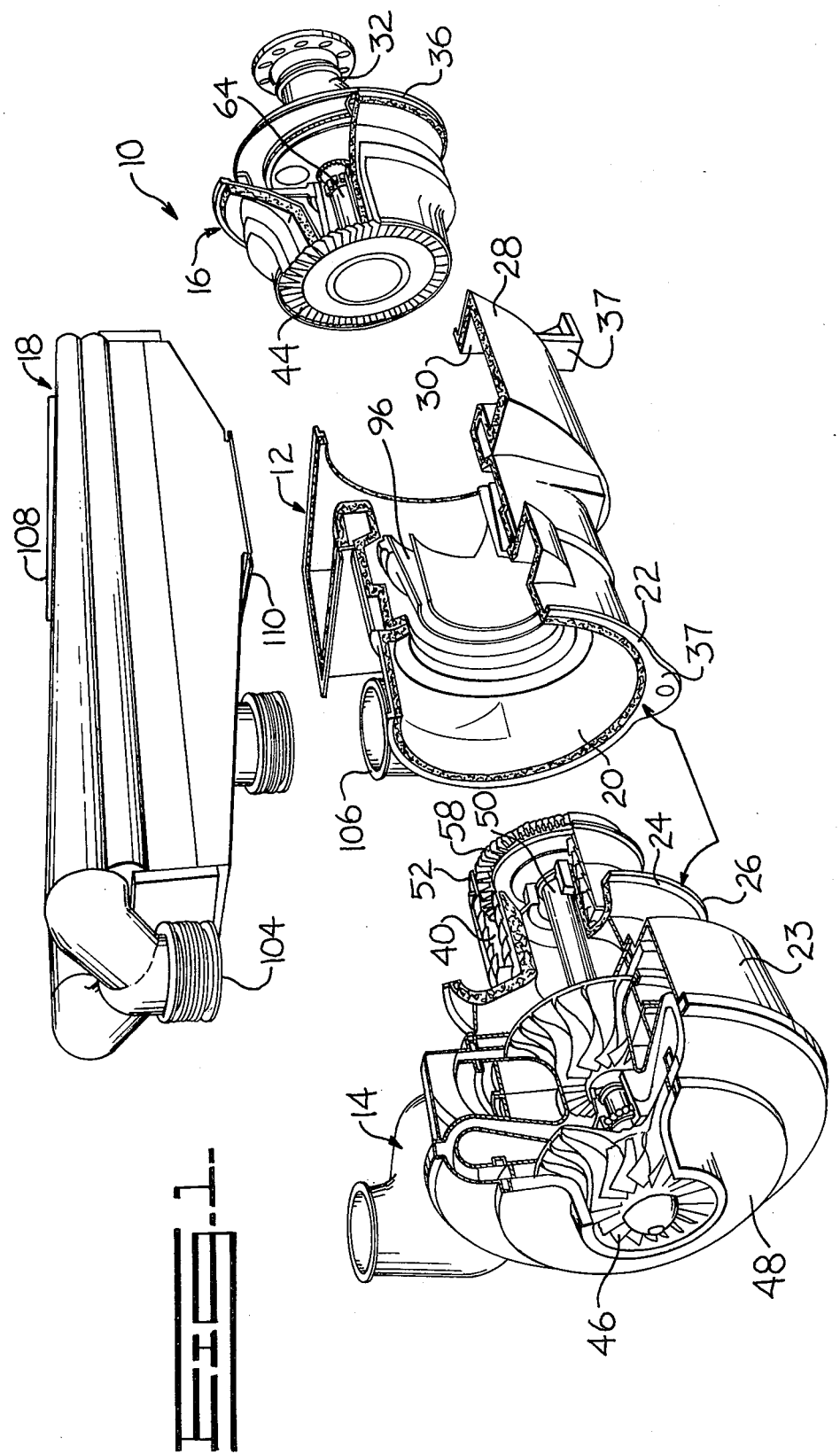
FIG. 1 illustrates in exploded partially cut away isometric view a modular gas turbine engine assembly in accordance with the preferred embodiment of the present invention.
Figure 2:
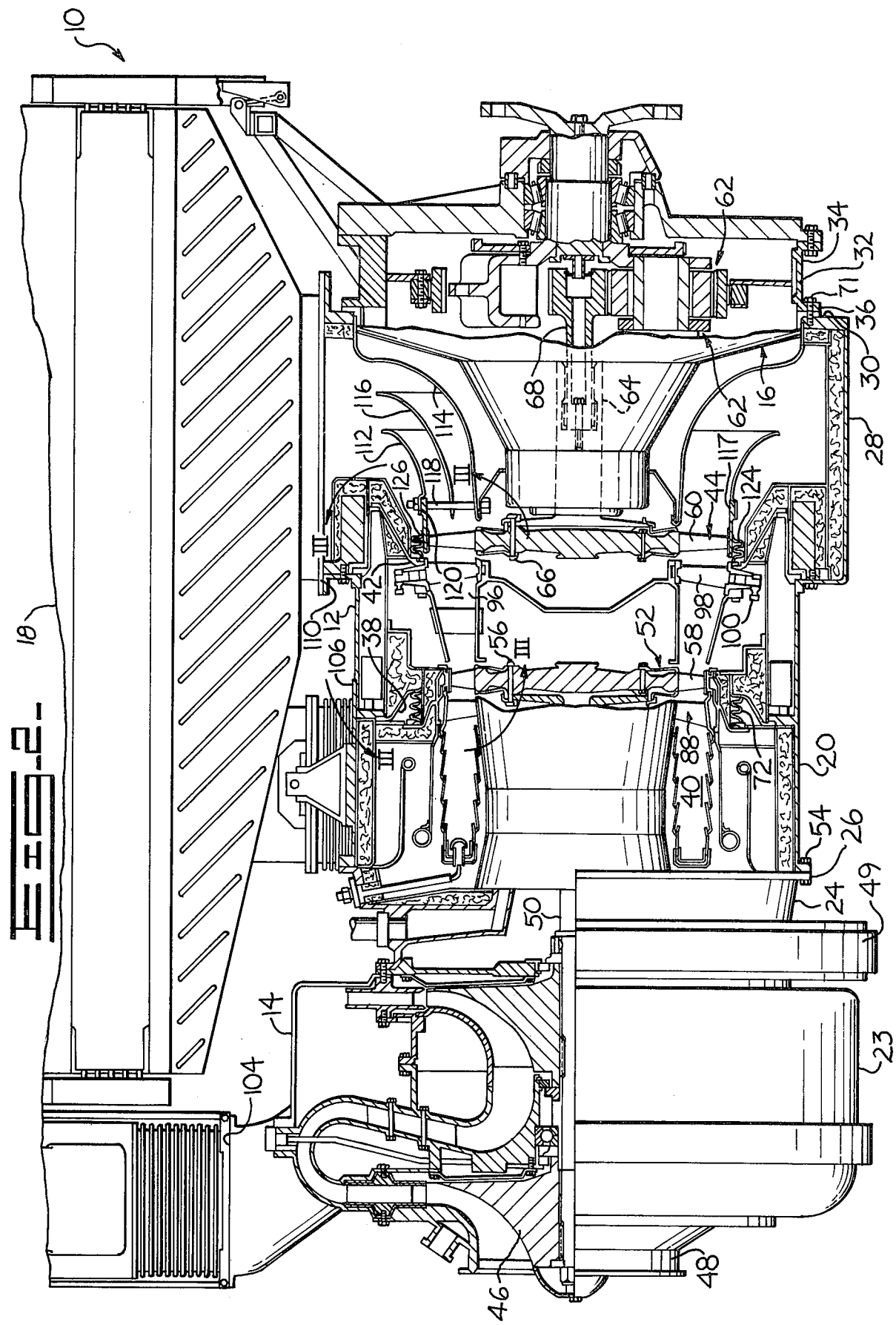
FIG. 2 illustrates in side elevational view, partially in section, a preferred embodiment of the modular gas turbine engine assembly of the present invention.

A modular gas turbine assembly 10 of the present invention is illustrated most completely in FIGS. 1 and 2. The assembly includes a case 12, a gasifier module 14, a power output module 16 and a heat exchanger 18.

The case 12 is generally tubular in shape as will be most apparent from reference to FIG. 1. The case includes adjacent a first end 20 thereof a first flange 22 which is adapted for attachment to a compressor collector in the form of a first tubular housing 23 of the gasifier module 14 adjacent a first end 24 of said first housing as by attachment to a first flange 26 adjacent said first end of the gasifier module. Adjacent a second end 28 of the case there is provided a second flange 30 extending inwardly. The second flange 30 of the case is fixedly detachably attachable adjacent a first end 34 of the second housing via a flange 36 extending outwardly adjacent said first end 34 of the second housing 32. Mounting means 37 extend from the exterior of the case 12 for mounting said case to a frame. This is extremely advantageous since it allows removal of either or both the gasifier module 14 and the power output module 16 from the case 12 without removal of the case 12 from whatever frame it is attached. This allows interchangeability of modules for repair of individual modules without complete removal of the assembly from its use situation. Also, since the modules are removed axially from the case 12 for example, generally, on dolly supported platforms or the like there is no need for lifting equipment although of course the use of some tackle may be desirable because of the weight of the modules. In the embodiment illustrated, a detachably attachable first flange means 38 extends inwardly within the case generally towards a combustor 40 of the gasifier module. Second means, in the embodiment illustrated a detachably attachable second flange means 42 extends inwardly in the case generally towards a power turbine portion 44 of the power output module 16. The purpose of the flange means 38 and 42 will become apparent in following.

The gasifier module 14 includes the first tubular housing 23 fixedly detachably attachable as previously explained with the first end 24 thereof adjacent the first end 20 of the case 12. Generally, the axis of the first housing is aligned generally with the axis of the case. A compressor 46 forms a part of the gasifier module and is located generally within a second end 48 of the first housing 23. The previously mentioned combustor 40 generally extends outwardly from the first end 24 of the first housing 23. The assembly 10 preferably includes as part of said gasifier module an auxiliary gear box 49 intermediate the compressor 46 and the combustor 40, said auxiliary gear box 49 being driven by a first shaft 50. The first shaft 50 extends from the compressor 46 to adjacent the combustor 40. The first shaft 50 is removable along with the rest of the gasifier module and generally along with a gasifier turbine 52 from the case 12. Removal of the gasifier module from the case can be accomplished by simply removing the bolt/nut combinations 54 which fasten together the first flange 22 of the case to the first flange 26 of the gasifier module. The gasifier turbine 52 is removably attachable to the first shaft 50 as by removing the bolt means 56. This provides easy access to the combustor 40 which is the portion of the assembly 10 which is most likely to need repair and maintenance. The gasifier module 52 includes first blades 58 positioned to be in the path of exhaust gases exiting the combustor 40. The first blades 58 then serve to turn the gasifier turbine 52 and thereby to drive the first shaft 50, which then drives the compressor 46. A starting motor (not illustrated) is used to drive the compressor 46 on start up, i.e., when the gasifier turbine 52 is not being turned at a high enough speed by the combustion gases exiting the combustor 40 to provide sufficient compression within the compressor 46.

The power output module 16 as previously stated includes the second housing 32 which is fixedly detachably attachable with the first end thereof 34 adjacent the second end 28 of the case 12. The power output module is detachably attachable to the case 12 with the axis of the second housing 32 aligned generally with the axis of the case. The power turbine 44 extends generally outwardly from the first end 34 of the second housing 32. The power turbine has a plurality of second blades 60 positioned to be in the path of exhaust gases exiting the gasifier turbine 52. More particularly the second blades 60 are positioned to receive the flow of exhaust gases from the first blades 58. The power output module further includes output gear means illustrated generally at 62 for taking power from a second shaft 64 which is driven by the power turbine 44. For ease in repair and maintenance the power turbine 44 is generally detachably attachable as via the bolting means 66 to the second shaft 64. Also, for ease in servicing an extension 68 of the second shaft 64, said extension is detachably attached to said second shaft. The extension serves to transfer power to the output gear means 62. Attachment of the second flange 30 of the case 12 to the flange 36 of the second housing 32 is generally accomplished via the bolts 71.

Figure 3:
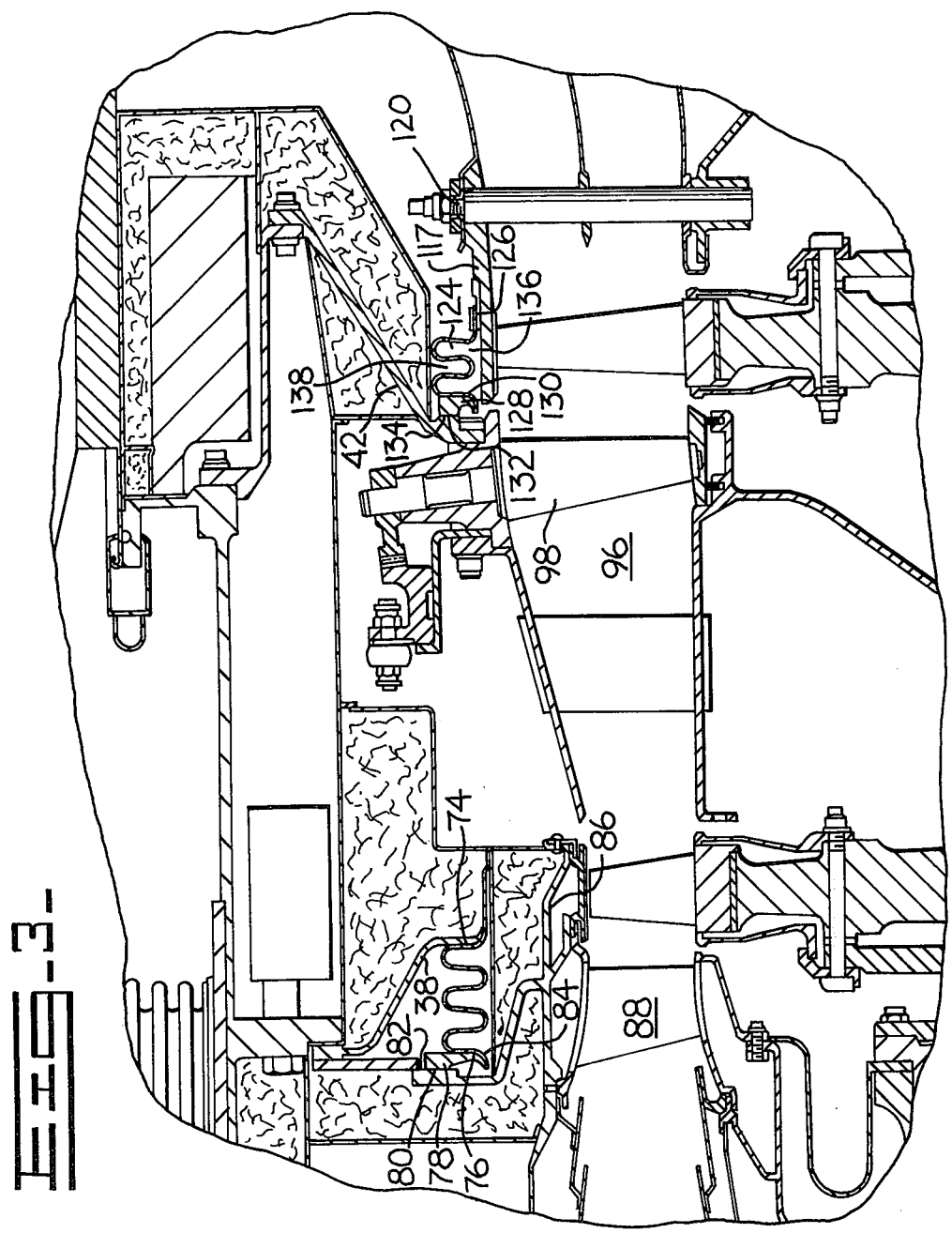
FIG. 3 illustrates in partial view, partially in section, area III—III of FIG. 2.

First slidable sealing means, in the embodiment illustrated in FIGS. 2 and 3, a first slidable bellows 72 slidably seals the gasifier module 14 to the case 12. The bellows 72 is affixed as by welding or the like to the first flange means 38 at one end 74 of said bellows 72, a second end 76 of the first bellows 72 being attached as by welding or the like to a ring 78 having a relatively large flat face 80 which slidably fits against a flat annular surface 84 supported by an outer ring 86 of a turbine nozzle vane assembly 88 which forms a part of the gasifier module 14 and is attached to direct flow of exhaust gases from the combustor 40 to the first blades 58 of the gasifier turbine 52. Thus, the first slidable sealing means, in this case the first bellows 72 sealingly extends between the nozzle vane assembly 88 and the first flange means 38. It is clear that a similar result is obtainable if the first bellows 72 is fixedly attached to the bracket 84 and slidably attached at the one end 74 of said first bellows 72 and the first flange means 38. As will be noted by reference to FIGS. 2 and 3, a cross-section of the first bellows comprises a plurality of loops. It is clear that alignment of the flat face 80 with the flat surface 82 is automatic with fastening of the first flange 22 of the case 12 to the first flange 26 of the first housing 22.

The case 12 includes annular channel means 96 which serve as a duct to direct flow to the power turbine 44 extending interiorly from the case 12 intermediate the first detachably attachable flange means 38 and the second detachably attachable flange means 42. The annular channel means 96 directs exhaust gases from the first blades 58 to the second blades 60. Having the annular channel means 96 be a part of the case 12 is very advantageous in that the combustor 40 is easily available for service and the like when the gasifier module 14 is removed from the case 12. Similarly the interior parts of the power output module 16 are easily available with minimum disassembly when the power output module 16 is removed from the case 12. The annular channel means 96 preferably includes a plurality of fixedly adjustable vanes 98 for adjusting the flow of the hot combustion gases through the second blades 60. Fixable adjustment of the vanes 98 is accomplished through use of a plurality of gear segments 100.

The assembly 10, as previously mentioned, includes in a preferred embodiment the heat exchanger 18. As will be noted most particularly be reference to FIGS. 1 and 2 the heat exchanger 18 is attached to receive compressed gas from the compressor 46 via the flanged port 104, to heat the compressed gas therein and to pass the resulting heated compressed gas to the combustor 40 via the flanged entry 106 in the case 12. Likewise, the heat exchanger 18 receives the exhaust gases from the power turbine 44, cools the exhaust gases therein while transferring some of the heat thereof to the compressed gas and passes the resulting cooled exhaust gases to the exterior of the heat exchanger via the exit 108. To maximize the efficiency of the assembly it is important that the exhaust gases be passed to the heat exchanger 18 with as little turbulence developed therein as is reasonably possible. In the embodiment of the invention illustrated this is accomplished by passing the exhaust gases into the flanged opening 110 of the heat exchanger 18. To assure that the flow into the heat exchanger 18 from the power turbine 44 is as smooth as possible the gases are guided between an outer shroud 112 and an inner shroud 114. A baffle 116 may be provided between the outer shroud 112 and the inner shroud 114 if so desired to aid in maintaining the flow as smooth as possible. The shapes of the outer shroud 112 the inner shroud 114 and the baffle 116 are designed according to well known fluid dynamic principles so as to minimize pressure losses due to turbulence.

To accomplish the proper positioning of a power turbine shroud 117, from which outer shroud 112 proceeds, relative to the power turbine 44 a plurality of struts 118 are provided supported by the power output module 16. The struts 118 extend radially outwardly adjacent the power turbine 44. The struts support at an outer end 120 thereof the power turbine shroud 117 which is positioned to provide the proper blade tip clearance. The outer shroud 112 and the inner shroud 114 direct flow from the power turbine shroud 117 of the power turbine 44 to the heat exchanger 18. The inner shroud 114 as will be noted from FIG. 2 is generally parallel to the outer shroud 112 for the aforementioned reason of reducing turbulence and concurrent power losses. The struts 118 also serve a second purpose. In particular, a second slidable sealing means for sealing the power output module 16 adjacent the power turbine 44 to the second flange means 42 is supported by said struts 118 and more particularly by the outer end 120 thereof. Thus, the second slidable sealing means extends between the outer end 120 of the struts 118 and the second flange means 42. Also, in the embodiment illustrated the second slidable sealing means, which in the embodiment shown in FIGS. 2 and 3 comprises a second bellows 124, extends between the power turbine shroud 117 and the second flange means 42. The second bellows 124 in the embodiment illustrated is fixedly attached at a first end 126 thereof to a respective one of the power turbine shroud 117 and the second flange means 42. A second annular seal 128 is fixedly attached to a second end 130 of the second bellows 124. The second annular seal 128 slidably sealingly contacts a respective other of the power turbine shroud 117 and the second annular seal 128. In the particular embodiment illustrated a flat face 132 of the second annular seal 128 fits slidingly against a flat annular surface 134 of said second flange means 42. It will be noted that no matter what the degree of alignment is of the power turbine with respect to the alignment of the annular channel means 96, i.e., with respect to the alignment of the case 12, within reasonable limits, the power turbine shroud 117 is invariably aligned so as to provide proper clearance for the second blades 60.

In the embodiment illustrated in FIGS. 2 and 3 the second bellows 124 comprises a plurality of loops and said second bellows 124 includes more of said loops opening towards a high pressure side 136 thereof than opening towards a low pressure side 138 thereof. This helps to provide added force acting against the second annular seal 128 to impel it towards the annular surface 134 as the assembly 10 operates and pressure differentials arise therewithin. A similar construction can be used with the first bellows 72, space permitting. As will be most apparent from examination of FIGS. 2 and 3, the high pressure side 136 of the second bellows 124 is exposed to pressure from the exhaust gases adjacent the power turbine 44 and the low pressure side 138 of the second bellows 124 is exposed to pressure from the exhaust gases after expansion via the inner and outer shrouds 114 and 112.

FIRST ALTERNATE EMBODIMENT

Figure 4:
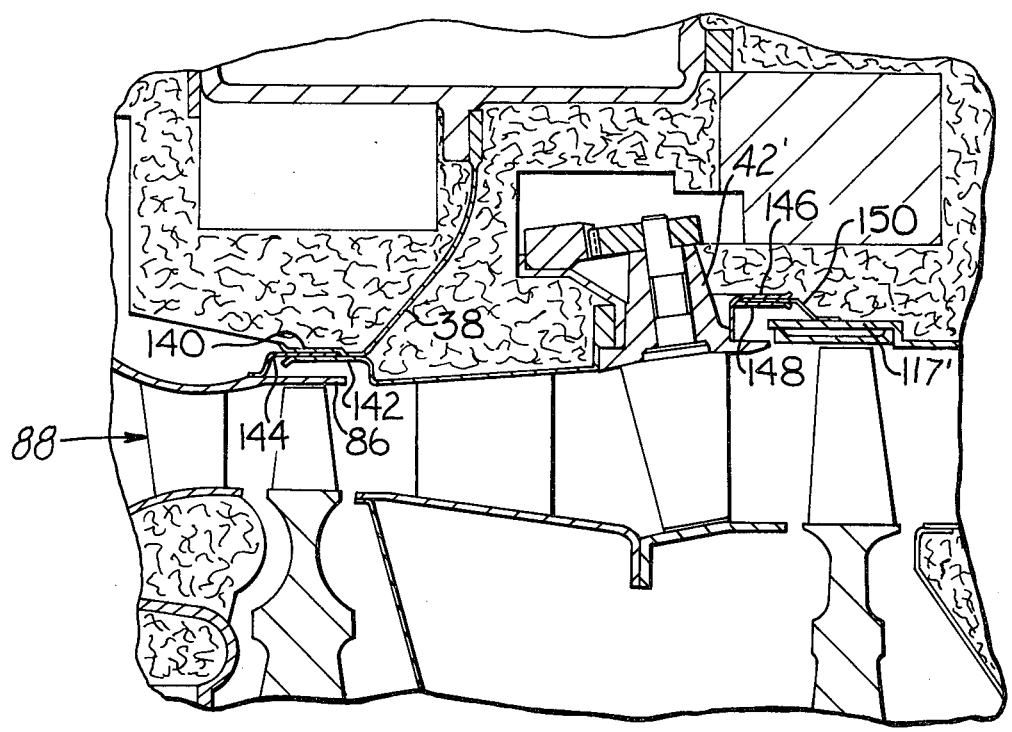
FIG. 4 illustrates in partial view, partially in section, an alternate embodiment of the sealing means of the present invention.

Referring now specifically to FIG. 4 there is illustrated therein a first alternate embodiment of the invention namely an embodiment wherein the first slidable sealing means comprises a first annular fish mouth 140 fixedly attached at a base 142 thereof to a respective one of the turbine nozzle vane assembly 88 and the first extending means, namely the first flange means 38. The first slidable sealing means further comprises, in the embodiment illustrated in FIG. 4, a first annular tongue 144 for slidably fitting in said first annular fish mouth 140, said first annular tongue being fixedly attached to a respective other of said turbine nozzle vane assembly 88 and said first flange means 38. It is preferred that the first annular fish mouth 140 be fixedly attached at its base 142 to the first flange means 38 as illustrated and the first annular tongue 144 be fixedly attached to the turbine nozzle vane assembly 88.

In the embodiment illustrated in FIG. 4 the second slidable sealing means comprises a second annular fish mouth 146 fixedly attached at a base 148 thereof to a respective one of the power turbine shroud 117' and the second extending means, namely the second flange means 42'. The second slidable sealing means also comprises a second annular fish mouth 146, said second annular tongue 150 being fixedly attached to a respective other of said power turbine shroud 117' and said second flange means 42'. In the preferred embodiment as illustrated in FIG. 4 the second annular fish mouth 146 is fixedly attached to the second flange means 42' and the second annular tongue 150 is fixedly attached to the power turbine shroud 117'.

Because of the flexibility of the first annular fish mouth 140 and the second annular fish mouth 146 as well as the flexibility of the first annular tongue 144 and the second annular tongue 150 alignment of the first annular tongue 144 to fit within the first annular fish mouth 140 and of the second annular tongue 150 to fit within the second annular fish mouth 146 provides ease of assembly.

SECOND ALTERNATE EMBODIMENT

Figure 5:
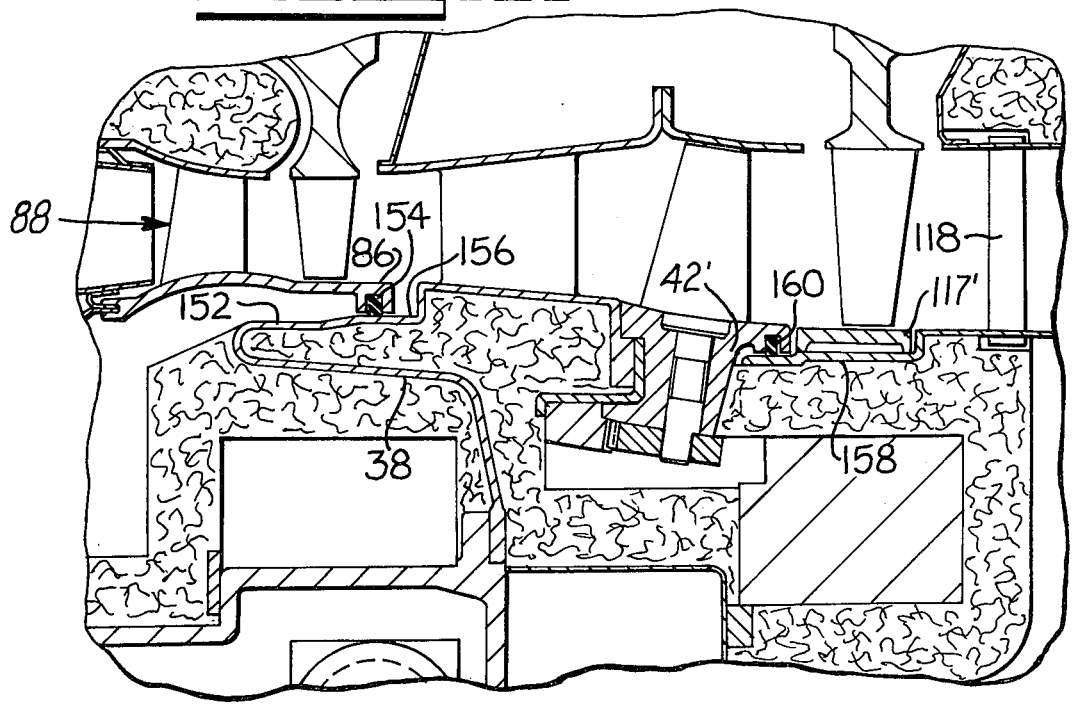
FIG. 5 illustrates in partial view, partially in section, yet another embodiment of the sealing means of the present invention.

Referring now to FIG. 5 there is illustrated a second alternate embodiment of the invention, namely an embodiment wherein the first annular slidable sealing means comprises a first shroud 152 fixedly attached to a respective one of the turbine nozzle vane assembly 88 and the first flange means 38. The first annular slidable sealing means further comprises in this embodiment a first ring seal 154 for slidably fitting against a surface 156 of the first shroud 152, the first ring seal 154 being fixedly attached to a respective other of said turbine nozzle vane assembly 88 and said first flange means 38. As illustrated in FIG. 5, the most preferred embodiment is wherein the first shroud 152 is fixedly attached to the turbine nozzle vane assembly 88 and the first ring seal 154 is fixedly attached to the first flange means 38.

In the embodiment as illustrated in FIG. 5, the second slidable sealing means comprises a second shroud 158 fixedly proceeding from a respective one of said power turbine shroud 117' and said second flange means 42' and a second ring seal 160 for slidably fitting against a surface of said second shroud 158, said second seal proceeding from a respective other of said power turbine shroud 117' and said second flange 42'. In the embodiment as illustrated in FIG. 5 and as is preferred, the second shroud 158 proceeds from the power turbine shroud 117' and the second ring seal 160 proceeds from the second flange means 42'.

It will be further obvious that it is possible to use as one of said first and second slidable sealing means one of said bellows, said fish mouth, and said ring seal and to use as the other of said first and second sealing means a different one of said bellows, said fish mouth and said ring seal. It will be further obvious that other circular seals can also be used within the contemplation of the invention.

While the invention has been described in connection with specific embodiments thereof, it will be understood that it is capable of further modifications, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A modular gas turbine engine assembly, comprising:
   1. a tubular case;
   2. a gasifier module having a first tubular housing releasably secured with a first end thereof adjacent a first end of said case with the axis of said first housing aligned generally with the axis of said case, a compressor generally within a second end of said first housing, a combustor generally extending outwardly from said first end of said first housing, and a first shaft extending from said compressor to adjacent said combustor;
   3. a gasifier turbine extending outwardly radially from said first shaft and having first blades positioned to be in the path of exhaust gases exiting said combustor to drive said first shaft and thereby drive said compressor;
   4. a power output module having a second tubular housing releasably secured with a first end thereof adjacent a second end of said case with the axis of said case, a power turbine generally extending outwardly from said first end of said second housing having second blades positioned to be in the path of exhaust gases exiting said gasifier turbine, output gear means, and a second shaft driven by said power turbine and driving said output gear means;
   5. annular channel means extending interiorly from said case intermediate said first and second extending means for directing said exhaust gases from said first blades to said second blades;
   6. first flange means attached to the interior of said case and extending inwardly within said case generally towards said combustor;
   7. second flange means attached to the interior of said case and extending inwardly within said case generally towards said power turbine;
   8. first slidable sealing means for slidably adjustably sealing said gasifier module adjacent said combustor to said first extending means; and
   9. second slidable sealing means for sealing said power output module adjacent said power turbine to said second extending means.

2. An assembly as in claim 1, including means extending from the exterior of said case for mounting it to a frame.

3. An assembly as in claim 1, wherein said gasifier turbine is detachably attachable to said first shaft so that removal of said gasifier turbine provides access to said combustor.

4. An assembly as in claim 1, including a detachably attachable extension shaft drivingly communicating said second shaft with said output gear means.

5. An assembly as in claim 1, wherein said gasifier module includes an auxiliary gear box intermediate said compressor and said combustor driven by said first shaft.

6. An assembly as in claim 1, including, extending from said second annular flange means in the gas flow path from said combustor to said power turbine:
a plurality of fixedly adjustable vanes.

7. An assembly as in claim 6, wherein said vanes receive the exhaust gases from said annular channel means and said annular channel means are supported by said second annular flange means.

8. An assembly as in claim 1, including a heat exchanger in fluid flow connection to an outlet of said compressor, an air inlet of said combustor and an exhaust outlet of said turbine attached to receive compressed gas from said compressor, heat said compressed gas therein and pass the resulting heated compressed gas to said combustor and to receive said exhaust gases from said power turbine, cool said exhaust gases therein while transferring some of the heat thereof to said compressed gas and pass the resulting cooled exhaust gases to the exterior of said heat exchanger.

9. An assembly as in claim 8, including a plurality of struts supported by said power output module and radially extending outwardly adjacent said power turbine said struts supporting at an outer end thereof an outer shroud which is positioned to direct flow of said exhaust gases from said power turbine to said heat exchanger.

10. An assembly as in claim 9, including an inner shroud supported at an inner end of said struts generally parallel to said outer shroud, said inner and outer shrouds being shaped to reduce losses due to turbulence in the flow of said exhaust gases from said power turbine to said heat exchanger.

11. An assembly as in claim 9, wherein said second slidable sealing means extends between said outer ends of said struts and said second extending means.

12. An assembly as in claim 9, including a power turbine shroud supported by said outer end of said struts and extending therefrom about said second blades in spaced relation therefrom and towards said second extending means and wherein said second slidable sealing means extends between said power turbine shroud and said extending means.

13. A modular gas turbine engine assembly, comprising:
1. A tubular case;
2. a gasifier module having a first tubular housing releasably secured with a first end thereof adjacent a first end of said case with the axis of said first housing aligned generally with the axis of said case, a compressor generally within a second end of said first housing, a combustor generally extending outwardly from said first end of said first housing, and a first shaft extending from said compressor to adjacent said combustor;
3. a gasifier turbine extending outwardly radially from said first shaft and having first blades positioned to be in the path of exhaust gases exiting said combustor to drive said first shaft and thereby drive said compressor;
4. a power output module having a second tubular housing releasably secured with a first end thereof adjacent a second end of said case with the axis of said second housing aligned generally with the axis of said case, a power turbine generally extending outwardly from said first end of said second housing having second blades positioned to be in the path of exhaust gases exiting said gasifier turbine, output gear means, and a second shaft driven by said power turbine and driving said output gear means, said power output module including a power turbine shroud supported thereby and extending about said second blades in spaced relation therefrom;
5. first means extending inwardly within said case generally towards said combustor;
6. second means extending inwardly within said case generally towards said power turbine, said power turbine shroud extending towards said second extending means;
7. first slidable sealing means for slidably adjustably sealing said gasifier module adjacent said combustor to said first extending means; and
8. second slidable sealing means comprising a bellows fixedly attached at a first end thereof to a respective one of said power turbine shroud and said second extending means and a second annular seal fixedly attached to a second end of said bellows and slidably sealingly contacting a respective other of said power turbine shroud and second annular seal.

14. An assembly as in claim 13, wherein a cross-section of said bellows comprises a plurality of loops and wherein said bellows includes more of said loops opening towards a high pressure side thereof than opening towards a low pressure side thereof to provide added force against said second annular seal as said assembly operates and pressure differentials arise therewithin.

15. An assembly as in claim 14, wherein said high pressure side of said bellows is exposed to pressure from said exhaust gases adjacent said power turbine and said low pressure side of said bellows is exposed to pressure from said exhaust gases after expansion and exterior of said outer shroud.

16. An assembly as in claim 8, wherein said gasifier module includes a turbine nozzle vane assembly attached to direct flow of said exhaust gases from said combustor to said first blades of said gasifier turbine, and wherein said first slidable sealing means extends between an outer ring of said turbine nozzle vane assembly and said first extending means.

17. A modular gas turbine engine assembly, comprising:
1. a tubular case;
2. a gasifier module having a first tubular housing releasably secured with a first end thereof adjacent a first end of said case with the axis of said first housing aligned generally with axis of said case, a compressor generally within a second end of said first housing, a combustor generally extending outwardly from said first end of said first housing, and a first shaft extending from said compressor to adjacent said combustor, said gasifier module including a turbine nozzle vane assembly attached to direct flow of said exhaust gases from said combustor to said first blades of said gasifier turbine;
3. a gasifier turbine extending outwardly radially from said first shaft and having first blades positioned to be in the path of exhaust gases exiting said compressor to drive said first shaft and thereby drive said compressor, said gasifier module including a turbine nozzle vane assembly attached to direct flow of said exhaust gases from said combustor to said first blades of said gasifier turbine;
4. a power output module having a second tubular housing releasably secured with a first end thereof adjacent a second end of said case with the axis of said second housing aligned generally with the axis of said case, a power turbine generally extending outwardly from said first end of said second housing having second blades positioned to be in the path of exhaust gases exiting said gasifier turbine, output gear means, and a second shaft driven by said power turbine and driving said output gear means;
5. first means extending inwardly within said case generally towards said combustor;
6. second means extending inwardly within said case generally towards said power turbine;
7. first slidable sealing means extending between an outer ring of said turbine nozzle vane assembly and said first extending means for slidably adjustably sealing said gasifier module adjacent said combustor to said first extending means, said first slidable sealing means comprising a first bellows fixedly attached at a first end thereof to a respective one of said outer ring of said turbine nozzle vane assembly and said first extending means and a first annular seal fixedly attached to a second end of said first bellows and slidably sealingly contacting a respective other of said outer ring and said first annular seal; and
8. second slidable sealing means for sealing said power output module adjacent said power turbine to said second extending means.

18. A modular gas turbine engine assembly, comprising:
1. a tubular case;
2. a gasifier module having a first tublar housing releasably secured with a first end thereof adjacent a first end of said case with the axis of said first housing aligned generally with axis of said case, a compressor generally within a second end of said first housing, a combustor generally extending outwardly from said first end of said first housing, and a first shaft extending from said compressor to adjacent said combustor;
3. a gasifier turbine extending outwardly radially from said first shaft and having first blades positioned to be in the path of exhaust gases exiting said compressor to drive said first shaft and thereby drive said compressor, said gasifier module including a turbine nozzle vane assembly attached to direct flow of said exhaust gases from said combustor to said first blades of said gasifier turbine;
4. a power output module having a second tubular housing releasably secured with a first end thereof adjacent a second end of said case with the axis of said second housing aligned generally with the axis of said case, a power turbine generally extending outwardly from said first end of said second housing having second blades positioned to be in the path of exhaust gases exiting said gasifier turbine, output gear means, and a second shaft driven by said power turbine and driving said output gear means;
5. first means extending inwardly within said case generally towards said combustor;
6. second means extending inwardly within said case generally towards said power turbine;
7. first slidable sealing means extending between an outer ring of said turbine nozzle vane assembly and said first extending means for slidably adjustably sealing said gasifier module adjacent said combustor to said first extending means, said first slidable sealing means comprising a first annular mouth formed of a pair of annular rings joined and fixedly attached at a base thereof to a respective one of said outer ring of said turbine nozzle vane assembly and said first extending means and a first annular tongue for slidably fitting in said first annular mouth fixedly attached to a respective other of said outer ring and said first extending means; and
8. second slidable sealing means for sealing said power output module adjacent said power turbine to said second extending means.

19. An assembly as in claim 18, wherein said first annular fish mouth is fixedly attached to said first extending means and said first annular tongue is fixedly attached to said outer ring.

20. A modular gas turbine engine assembly, comprising:
1. a tubular case;
2. a gasifier module having a first tubular housing releasably secured with a first end thereof adjacent a first end of said case with the axis of said first housing aligned generally with the axis of said case, a compressor generally within a second end of said first housing, a combustor generally extending outwardly from said first end of said first housing, and a first shaft extending from said compressor to adjacent said combustor;
3. a gasifier turbine extending outwardly radially from said first shaft and having first blades positioned to be in the path of exhaust gases exiting said combustor to drive said first shaft and thereby drive said compressor;
4. a power output module having a second tubular housing releasably secured with a first end thereof adjacent a second end of said case with the axis of said second housing aligned generally with the axis of said case, a power turbine generally extending outwardly from said first end of said second housing having second blades positioned to be in the path of exhaust gases exiting said gasifier turbine, output gear means, and a second shaft driven by said power turbine and driving said output gear means, said power output module including a power turbine shroud supported thereby and extending about said second blades in spaced relation therefrom;
5. first means extending inwardly within said case generally towards said combustor;
6. second means extending inwardly within said case generally towards said power turbine said power turbine shroud extending towards said second extending means;
7. first slidable sealing means for slidably adjustably sealing said gasifier module adjacent said combustor to said first extending means;
8. second slidable sealing means extending between said power turbine shroud and said second extending means for sealing said power output module adjacent said power turbine to said second extending means;
9. said second slidable sealing means comprising a second annular mouth formed of a pair of annular rings joined and fixedly attached at a base thereof to a respective one of said power turbine shroud and said second extending means and a second annular tongue for slidably fitting in said second annular mouth fixedly attached to a perspective other of said power turbine shroud and said second extending means.

21. An assembly as in claim 20, wherein said second annular fish mouth is fixedly attached to said second extending means and said second annular tongue is fixedly attached to said power turbine shroud.

22. A modular gas turbine engine assembly, comprising:
1. a tubular case;
2. a gasifier module having a first tubular housing releasably secured with a first end thereof adjacent a first end of said case with the axis of said first housing aligned generally with the axis of said case, a compressor generally within a second end of said first housing, a combustor generally extending outwardly from said first end of said first housing, and a first shaft extending from said compressor to adjacent said combustor;
3. a gasifier turbine extending outwardly radially from said first shaft and having first blades positioned to be in the path of exhaust gases exiting said compressor to drive said first shaft and thereby drive said compressor, said gasifier module including a turbine nozzle vane assembly attached to direct flow of said exhaust gases from said combustor to said first blades of said gasifier turbine;
4. a power output module having a second tubular housing releasably secured with a first end thereof adjacent a second end of said case with the axis of said second housing aligned generally with the axis of said case, a power turbine generally extending outwardly from said first end of said second housing having second blades positioned to be in the path of exhaust gases exiting said gasifier turbine, output gear means, and a second shaft driven by said power turbine and driving said output gear means;

23. An assembly as in claim 22, wherein said first shroud is fixedly attached to said outer ring and said first ring seal is fixedly attached to said first extending means.

24. A modular gas turbine engine assembly, comprising:
1. a tubular case;
2. a gasifier modular having a first tubular housing releasably secured with a first end thereof adjacent a first end of said case with the axis of said first housing aligned generally with the axis of said case, a compressor generally within a second end of said first housing, a combustor generally extending outwardly from said first end of said first housing, and a first shaft extending from said compressor to adjacent said combustor;
3. a gasifier turbine extending outwardly radially from said first shaft and having first blades positioned to be in the path of exhaust gases exiting said combustor to drive said first shaft and thereby drive said compressor;
4. a power output module having a second tubular housing releasably secured with a first end thereof adjacent a second end of said case with the axis of said second housing aligned generally with the axis of said case, a power turbine generally extending upwardly from said first end of said second housing having second blades positioned to be in the path of exhaust gases exiting said gasifier turbine, output gear means, and a second shaft driven by said power turbine and driving said output gear means said power output module including a power turbine shroud supported thereby and extending about said second blades in spaced relation therefrom;
5. first means extending inwardly within said case generally towards said combustor;
6. second means extending inwardly within said case generally toward said power turbine;
7. first slidable sealing means for slidably adjustably sealing said gasifier module adjacent said combustor to said first extending means; and
8. second slidable sealing means extending between said power turbine shroud and said second extending means for sealing said power output module adjacent said power turbine to said second extending means, said second slidable sealing means comprising a shroud fixedly attached to a respective one of said power turbine shroud and said second extending means and a ring seal for slidably fitting against a surface of said shroud fixedly attached to arespective other of said power turbine shroud and said second extending means.

25. An assembly as in claim 24, wherein said second shroud is fixedly attached to said power turbine shroud and said second ring seal is fixedly attached to said second extending means.

* * * * *